No. 683,326. Patented Sept. 24, 1901.
W. H. PRINZ.
PROCESS OF STEEPING AND WASHING GRAIN.
(Application filed Feb. 11, 1901.)
(No Model.) 2 Sheets—Sheet 1.
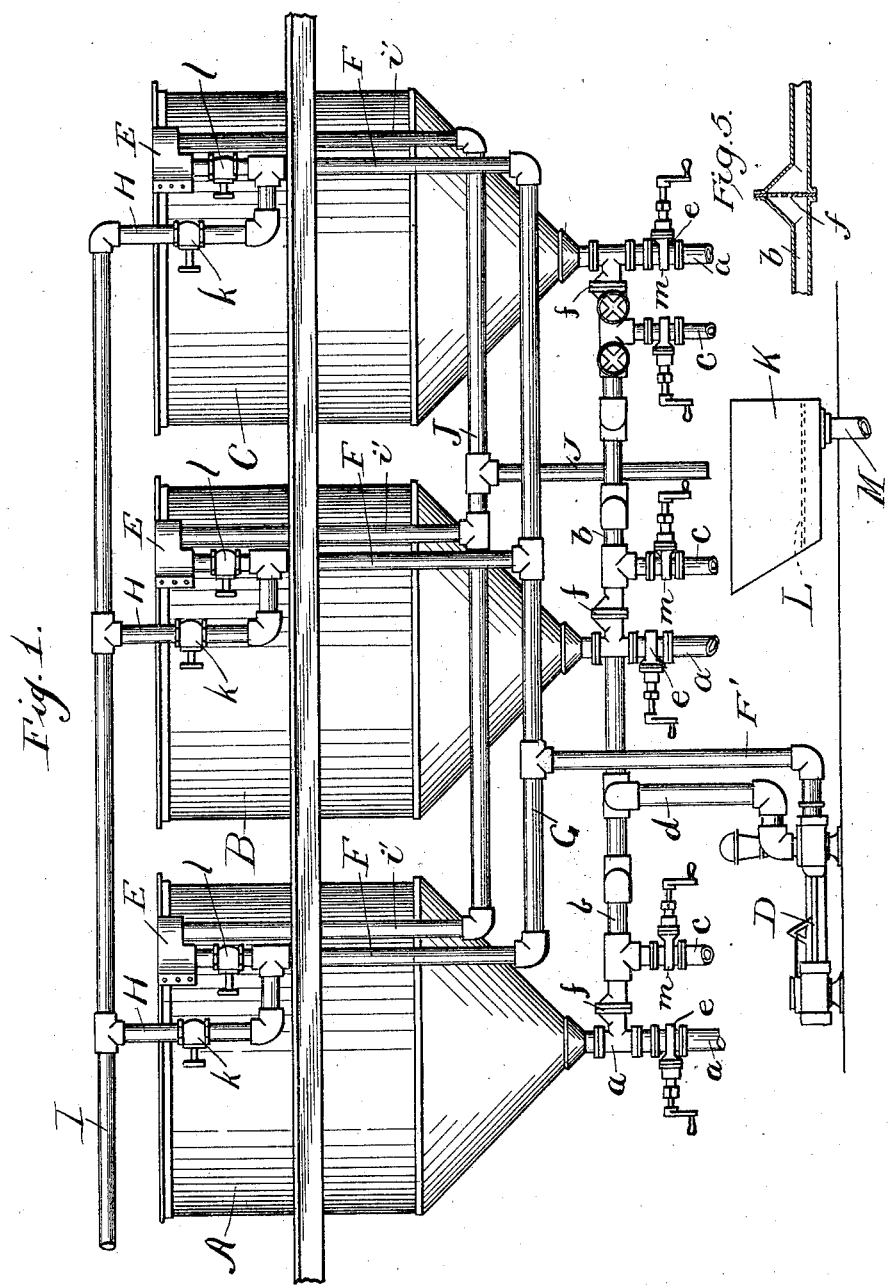
Witnesses.
E. J. Wilson.
John Snowhook.
Inventor.
William H. Prinz
By Rudolph Wm. Lotz Atty.

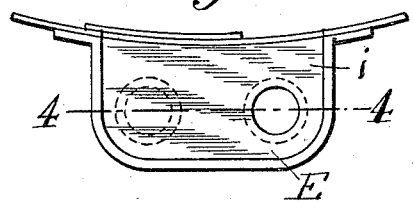
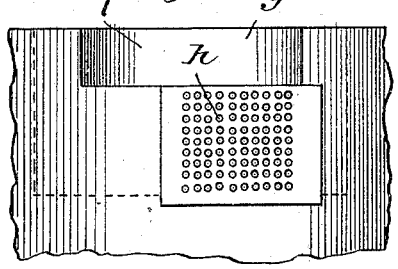
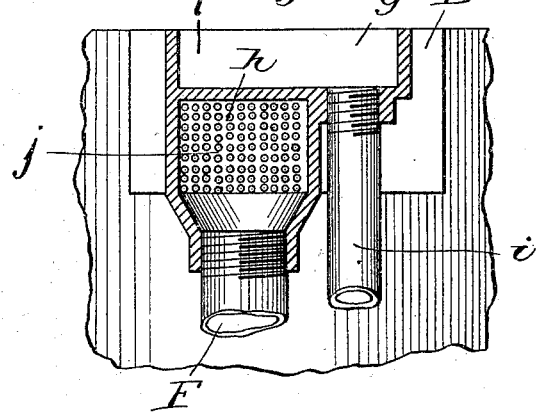

UNITED STATES PATENT OFFICE.

WILLIAM H. PRINZ, OF AUSTIN, ILLINOIS, ASSIGNOR TO THE SALADIN PNEUMATIC MALTING CONSTRUCTION CO., OF CHICAGO, ILLINOIS.

PROCESS OF STEEPING AND WASHING GRAIN.

SPECIFICATION forming part of Letters Patent No. 683,326, dated September 24, 1901.

Application filed February 11, 1901. Serial No. 46,881. (No specimens.)

*To all whom it may concern:*

Be it known that I, WILLIAM H. PRINZ, a citizen of the United States, residing at Austin, in the county of Cook and State of Illinois, have invented certain new and useful Improvements in Processes of Steeping and Washing Grain; and I do hereby declare the following to be a full, clear, and exact description of the invention, such as will enable others skilled in the art to which it appertains to make and use the same.

My invention relates to a novel process for steeping and washing grain, the object being to provide a process whereby the grain is kept continually agitated and thereby thoroughly washed and diseased grains and dirt removed and at the same time a given temperature maintained in the steep-tanks; and it consists in the various steps hereinafter fully described and claimed.

In the accompanying drawings, illustrating a form of apparatus for carrying out my process, Figure 1 is a view in elevation of said apparatus. Fig. 2 is a detail top elevation of the overflow device used. Fig. 3 is an elevation of said overflow looking from the inside of the tank. Fig. 4 is a section of same on the line 4 4 of Fig. 2. Fig. 5 is a detail sectional view showing a strainer interposed in one of the pipes.

My process consists, essentially, in maintaining a constant circulation of water in the steep-tanks, constantly discharging a portion of the water, together with diseased germs and dirt, and replacing the discharged water with fresh water. By this means the grain is kept continually in motion, thus enabling diseased kernels to become freed and reach the surface, where the same float and are carried off, together with floating particles of chaff, &c. At the same time by constantly introducing fresh water the temperature in the tanks is maintained at a uniform degree and each kernel is kept constantly surrounded by water instead of being partially in contact with other kernels, the duration of steeping being thus considerably shortened. To carry out said process, I have designed an apparatus of which the following is a full description:

Referring to said drawings, A, B, and C indicate steep-tanks, which are connected at their lower ends with pipes $a$, which in turn are connected with pipes $b$, connecting said pipes $a$ with waste-pipes $c$ and water-supply pipe $d$. Said pipes $a$ are provided with valves $e$ below the connections with said pipes $b$, so that the contents of the tanks can be drawn off directly through said pipe $a$. A strainer $f$ is interposed in pipe $b$ between pipes $a$ and $c$, so that water can be drawn off from said tanks without withdrawing grain therefrom. Said supply-pipe $d$ is connected with the delivery end of a pump D, the water from which passes through pipes $d$ and $b$ and thence through pipes $a$ into the lower ends of steep-tanks, thereby agitating the grain therein. The water-level in said steep-tanks is regulated by means of an overflow E, consisting of a small casing secured to the outer wall of each tank at its upper end and communicating with the latter through openings $g$ and $h$. Said overflow E is divided into two chambers $i$ and $j$, the former of which is fed from said opening $g$ and the latter from said opening $h$. Said opening $h$ is covered by a strainer to exclude grain from said chamber $j$, so that only water enters the latter. A pipe F connects said chamber $j$ of each of said overflows E with a pipe G, which in turn is connected with the suction end of the pump D by means of a pipe F'. Pipes H connect each of said pipes F with a water-supply pipe I, through which fresh water is constantly introduced into the system. A valve $k$ is interposed in each of said pipes H and a valve $l$ in each of said pipes F between said overflow E and the connection with said pipes H. The chamber $i$ of each of said overflows E is connected by means of a pipe $i'$ with a waste-pipe J, leading to a tank K, having a false perforated bottom L, adapted to catch the grain, while allowing the water to run off into the sewer through pipe M. Diseased or dead grain always floats on the surface of the water, and such grain is released by agitating the mass and permitted to reach the surface, whence it is carried by the water into chamber $i$ of said overflow E and thence into said tank K, where it is caught. The water thus withdrawn from the system is replaced by fresh water from the supply-pipe I. In this manner the entire steep-water is gradually renewed, which is advantageous for several reasons, while at the same time the presence of diseased germs in the malt is obviated, thus producing a very high grade of malt.

When it is desired to entirely renew the water in the tanks, the valves $m$ in pipes $c$ are opened, thus withdrawing the water and leaving the grain in the tanks. When it is desired to withdraw the grain, the valves $e$ are opened, thus withdrawing the grain, together with the water.

I claim as my invention—

1. The process of steeping grain, which consists in maintaining a constant circulation of water in said tanks, discharging a portion of said water, and introducing fresh water to replace the discharged water.

2. The process of steeping grain, which consists in maintaining a constant circulation of the water in the steep-tank by withdrawing water from the upper end and redelivering same at the lower end of the tank, discharging a portion of said water out of the circulation at a point above said first-named point of withdrawal, and introducing fresh water into the circulation to replace the discharged water.

3. The process of steeping grain which consists in maintaining practically constant circulation of the water and thereby agitating the grain, withdrawing a portion of said water at intervals and replacing same with fresh water, thereby maintaining a practically constant temperature in the tank, the withdrawn water being adapted to carry off diseased grain.

In testimony whereof I affix my signature in presence of two witnesses.

WILLIAM H. PRINZ.

Witnesses:
RUDOLPH WM. LOTZ,
E. F. WILSON.